(12) United States Patent
Kimmig et al.

(10) Patent No.: US 7,066,313 B2
(45) Date of Patent: Jun. 27, 2006

(54) SELF-ADJUSTING CLUTCH

(75) Inventors: Karl-Ludwig Kimmig, Ottenhöfen (DE); Philippe Mih, Gambsheim (FR); Mathieu Jordan, Strasbourg (FR)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/821,619

(22) Filed: Apr. 10, 2004

(65) Prior Publication Data
US 2004/0262114 A1    Dec. 30, 2004

(30) Foreign Application Priority Data
Apr. 17, 2003 (DE) ................ 103 18 154
Aug. 5, 2003 (DE) ................ 103 35 724

(51) Int. Cl.
*F16D 13/75* (2006.01)
(52) U.S. Cl. ................ 192/70.25; 192/70.27; 192/89.24; 192/111 A
(58) Field of Classification Search .......... 192/70.25, 192/111 A, 70.27, 89.24
See application file for complete search history.

(56) References Cited

U.S. PATENT DOCUMENTS

| | | | | |
|---|---|---|---|---|
| 4,210,233 A * | 7/1980 | Courbot | .................... | 192/89.23 |
| 4,425,991 A * | 1/1984 | Hays | ........................ | 192/70.27 |
| 4,558,771 A * | 12/1985 | Despres | .................... | 192/70.18 |
| 4,844,226 A * | 7/1989 | Taketani | .................. | 192/111 A |
| 5,450,934 A | 9/1995 | Maucher | .................. | 192/70.25 |
| 5,826,691 A | 10/1998 | Asada et al. | ............. | 192/89.24 |
| 5,984,067 A * | 11/1999 | Weidinger et al. | ....... | 192/70.25 |
| 6,123,180 A * | 9/2000 | Weidinger | ................ | 192/70.25 |
| 6,202,818 B1 * | 3/2001 | Maucher | ................. | 192/70.25 |
| 2002/0060118 A1 * | 5/2002 | Beneton et al. | ............. | 192/48.8 |

FOREIGN PATENT DOCUMENTS

| | | |
|---|---|---|
| FR | 2 731 754 A1 | 9/1996 |
| FR | 2 745 869 A1 | 9/1997 |

* cited by examiner

*Primary Examiner*—Saul Rodriguez
(74) *Attorney, Agent, or Firm*—Alfred J. Mangels (57) ABSTRACT

A friction clutch wherein a rotary housing supports a tiltable diaphragm spring and confines a pressure plate that is axially movably but non-rotatably mounted therein for movement toward and away from friction linings on a clutch disc between the pressure plate and a prime-mover-driven counterpressure plate. The diaphragm spring is arranged to urge the pressure plate in a direction to engage the clutch and is maintained in stressed condition within the housing, even when not installed in the power train of a motor vehicle. The diaphragm spring is installed so that it is operatively associated with the pressure plate in an elastically stressed condition. The pressure plate includes an annular portion that supports the diaphragm spring, and further supports a biasing arrangement that is radially offset relative to the supporting portion and that serves to maintain the diaphragm spring on the pressure plate in the resiliently stressed condition.

17 Claims, 5 Drawing Sheets

SELF-ADJUSTING CLUTCH

BACKGROUND OF THE INVENTION

1. Field of the Invention

The present invention relates to improvements in friction clutches, particularly in self-adjusting clutches that can automatically compensate for wear of their friction linings, pressure plates, counterpressure plates and/or other components that are subject to wear during use of the clutch, for example, between the prime mover (such as an internal combustion engine) and the change-speed transmission or gearbox in the power train of a motor vehicle.

2. Description of the Related Art

A friction clutch of the type to which the present invention pertains normally includes a diaphragm spring or a Belleville spring that is tiltably mounted in a rotary housing in such away that it must share the angular movements of the housing but has limited freedom of axial movement relative thereto. The pressure plate cooperates with a counterpressure plate, such as a flywheel that rotates with the housing and cooperates with the pressure plate, to clamp, with or without slippage, the friction linings of a so-called clutch plate or clutch disc when the clutch is engaged, either entirely or in part (that is, without or with slip between the pressure plate and the counterpressure plate on the one hand, and the clutch disc on the other hand). The counterpressure plate can receive torque from the rotary output element of a prime mover to rotate the housing and the pressure plate, and the clutch disc can drive the rotary input element of the gearbox when the clutch is at least partially engaged.

Self-adjusting clutches are disclosed, for example, in German patents Nos. DE 4306505 A1, DE 42 39 289 A1 and DE 43 22 677 A1. Reference may also be had to commonly-owned U.S. Pat. No. 5,409,091 (granted on Apr. 25, 1995 to Reik et al. and entitled "AUTOMATICALLY ADJUSTABLE FRICTION CLUTCH") and U.S. Pat. No. 5,450,934 (granted on Sep. 19, 1995 to Maucher and entitled "FRICTION CLUTCH").

Friction clutches of the type to which the present invention pertains are designed in such away that at least a portion of the closing or engaging force that determines the magnitude of transmittable torque is introduced into the clutch from the outside by the diaphragm spring. The diaphragm spring preferably includes a ring-shaped main or primary portion of variable conicity, and actuating levers in the form of prongs or tongues that extend from the radially inner side of the main portion. Such prongs can be and preferably are of one piece with the main portion of the diaphragm spring.

An object of the present invention is to provide a novel and improved friction clutch that can be utilized with advantage in the power trains of motor vehicles, particularly to transmit torque between the rotary output element (such as a crankshaft or a camshaft) of a prime mover (for example, an internal combustion engine) and the rotary input element (such as a shaft) of a change-speed transmission or gearbox in the power train.

Another object of the invention is to provide a novel and improved self-adjusting friction clutch that can automatically compensate for wear of the friction linings of its clutch plate or clutch disc and certain other parts that undergo wear in response to repeated engagement and disengagement of the clutch.

A further object of the invention is to provide a novel mounting of the diaphragm spring in the housing of a self-adjusting friction clutch.

An additional object of the invention is to provide groups of preassembled parts that can be joined to constitute an improved friction clutch for use in the power trains of motor vehicles.

Still another object of the invention is to provide a novel and improved power train that can be utilized in motor vehicles and that includes the above-outlined self-adjusting friction clutch.

An additional object of the invention is to provide a novel and improved combination of a diaphragm spring, housing, and pressure plate for use in a friction clutch, particularly a self-adjusting clutch for use in the power trains of motor vehicles.

A further object of the invention is to provide a novel and improved multiple clutch unit that includes at least one self-adjusting friction clutch of the above-outlined character.

SUMMARY OF THE INVENTION

Briefly stated, in accordance with one aspect of the present invention, a repeatedly engageable and disengageable friction clutch is provided that includes a housing mounted for rotation about a predetermined axis. A pressure plate is non-rotatably connected to the housing with limited freedom of axial movement relative to the housing in a first direction to engage the clutch, and in a second direction to disengage the clutch. A diaphragm spring is tiltably mounted in the housing in elastically deformed condition and is arranged to bias the pressure plate in one of the first and second directions.

In accordance with one feature of the present invention, the diaphragm spring is maintained in the elastically deformed condition before the clutch is put to use, that is, to transmit torque between a rotary output element (such as a crankshaft or a camshaft) of a prime mover (for example, an internal combustion engine) and a rotary input element (for example, a shaft) in the transmission or gearbox of the power train in a motor vehicle. In other words, when the diaphragm spring is installed in the power train of a motor vehicle it is caused to store energy when properly mounted in the housing of the improved friction clutch.

The diaphragm spring is preferably provided with radially inwardly extending prongs or tongues that can be displaced axially of the housing by a clutch actuating device, to thereby change the conicity of the diaphragm spring; this entails a closing or engagement of the clutch.

The arrangement can be such that, in order to store energy, the diaphragm spring is mounted in and supported by the housing in such a way that it stores at least some energy, that is, it is maintained in an elastically deformed condition.

To that end, the pressure plate can mount a ring-shaped supporting portion for the diaphragm spring, as well as a tensioning means that is radially offset relative to, the supporting portion and that serves to maintain the diaphragm spring on the pressure plate in a resiliently stressed condition. The tensioning means is or can be fixed against movement relative to the pressure plate, as viewed in the axial direction of the housing.

In accordance with a presently preferred embodiment, the tensioning means can include an annular array of elements (such as bolts) that are rigid with the pressure plate and extend in at least substantial parallelism with the axis of the housing through openings provided therefor in the diaphragm spring. Those elements can supportingly engage the diaphragm spring at that side of the spring that faces away from the pressure plate. If the aforementioned elements are bolts, they can be riveted to the pressure plate. Those portions of the bolts that are disposed at the aforementioned side of the diaphragm spring are or can be enlarged, at least in the circumferential direction of the diaphragm spring, to constitute axial supports for portions of such spring.

The bolts can be replaced with other shaped parts that are made of sheet metal and that are suitably affixed to the pressure plate. Still further, it is possible to replace the bolts and/or the sheet metal parts with holding means that constitute integral portions of the diaphragm spring and can resemble lugs. Such lugs can extend axially of the housing and can include parts that are designed to engage (such as to overlie) complementary or cooperating parts on the pressure plate. The arrangement is preferably such that the parts of the diaphragm spring and the complementary parts of the pressure plate have a certain axial play in order to ensure that the conicity of the diaphragm spring can undergo certain changes.

In accordance with another presently preferred embodiment, the diaphragm spring can include a radially outer annular portion that is tiltable with reference to and that contacts the housing of the improved friction clutch, a second annular portion that is disposed radially inwardly of the outer annular portion and that cooperates with an annular complementary portion borne by the pressure plate, and a third annular portion located radially inwardly of the second annular portion and that cooperates with the aforementioned holding means to ensure that the diaphragm spring remains in a stressed (energy storing) condition. For example, the holding means can be an annular array of bolts and can be disposed in the region where the tongues or prongs of the diaphragm spring extend radially inwardly of its annular main portion. Such bolts can be riveted or otherwise affixed to the pressure plate on the one hand, and can extend in axial parallelism with the housing through passages between the tongues of the diaphragm spring on the other hand. The bolts can overlie the neighboring tongues of the diaphragm spring, and to that end the bolts can include portions that are enlarged, at least in the circumferential direction of the diaphragm spring, and can abut the adjacent portions of the spring, as viewed in the direction of the clutch housing axis. That arrangement ensures that the diaphragm spring can be mounted on the pressure plate in at least slightly deformed (stressed) condition even before the clutch is installed in the power train of a motor vehicle, or elsewhere.

The improved clutch can further include suitable means for compensating at least for wear of the friction linings on the clutch disc, and such compensating means can be installed between the housing and the diaphragm spring of the improved clutch. The compensating means can include or constitute the fulcrum that is carried by the housing (such as by a cover or lid of the housing) and that tiltably mounts the diaphragm spring.

The wear compensating means can include at least one resilient sensor (for example, a further diaphragm spring and/or prestressed leaf springs) that bears or bear, directly or indirectly, on the diaphragm spring in the direction of the housing axis when the clutch is engaged, and an annular adjusting member that is interposed between the housing and the diaphragm spring and serves to shift the diaphragm spring relative to the housing in the axial direction of the latter and through a distance that is dependent on the extent of wear of the friction linings. If the wear compensating means includes leaf springs, such springs can be installed between the pressure plate and the housing of the improved friction clutch. Still further, the wear compensating means can include an annular array of first ramps that extend circumferentially of the housing and that slope in the direction of the axis of the housing, and an annular array of complementary ramps that also slope axially and that are mounted in or on the housing. When the wear compensating means is caused to turn about the axis of the housing, the fulcrum for the diaphragm spring is moved axially of the housing to an extent that is commensurate with the extent of wear at least of the friction linings. One set of the ramps is biased relative to the ramps of the other set (as seen circumferentially of the housing) by suitable resilient means, such as one or more coil springs, that serve to ensure that the axial position of the pressure plate is changed (toward the counterpressure plate) to an extent that is commensurate with the wear at least of the friction linings.

The exact nature of the wear compensating means, including their ring-shaped parts, ramps, complementary ramps, and energy-storing parts that cause the two sets of ramps to turn relative to each other to an extent commensurate with the extent of wear at least of the friction linings on the clutch disc, forms no part of the present invention. Reference should be had to the prior publications that are identified in the specification of the present application. The same applies as concerns the nature, installation, and mode of operation of resilient sensor means.

As concerns the supporting force that must be furnished for the diaphragm spring by the resilient sensor, the necessary adaptations that are attributable to the lever action taken over by the diaphragm spring will be fully described hereinafter. All that need be stated here is that the diaphragm spring serves as a lever to hold the clutch in an engaged condition, and it is supported by the resilient sensor during actuation of the clutch so that, at least during the initial stage of engagement of the clutch, the tilting diameter is axially maintained by the sensor.

BRIEF DESCRIPTION OF THE DRAWINGS

The novel features that are considered as characteristic of the invention are set forth in particular in the appended claims. The improved friction clutch itself, however, both as to its construction and the modes of assembling, installing, and operating the same, together with numerous additional important and advantageous features and attributes thereof, will be best understood upon perusal of the following detailed description of certain presently preferred specific embodiments, and with reference to the accompanying drawings, in which:

DESCRIPTION OF THE PREFERRED EMBODIMENTS

Figures 1, 2:
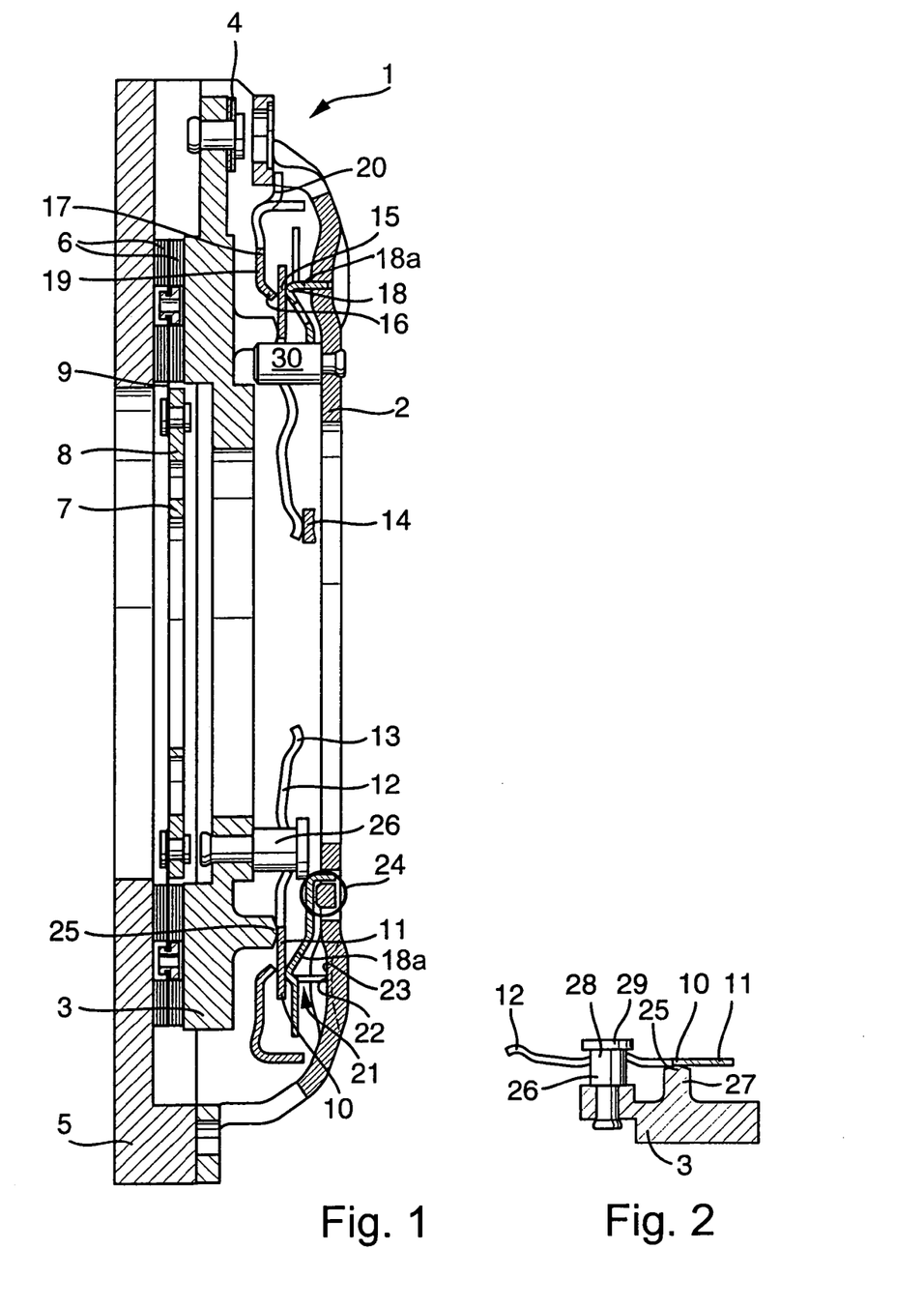
FIG. 1 is an axial cross-sectional view of one embodiment of a self-adjusting friction clutch in accordance with the present invention.
FIG. 2 is a fragmentary, axial cross-sectional view of the pressure plate and the diaphragm spring of the friction clutch of FIG. 1.

FIG. 1 shows a friction clutch 1 in accordance with the present invention that is in the disengaged condition. The clutch includes a housing or casing 2 in the form of a cover made of a metallic sheet material. Casing 2 is non-rotatably connected with a pressure plate 3 that has freedom of at least some (limited) axial movement relative to the housing. The means for moving the pressure plate 3 axially of the housing 2 includes leaf springs 4, each having a first end portion fastened (such as riveted) to the housing 2 and a second end portion fastened (for example, riveted) to the pressure plate 3. The housing 2 is fixedly secured to a counterpressure plate 5 by means of screws, for example, or other suitable fasteners.

The pressure plate 3 and the counterpressure plate 5 are provided with confronting friction surfaces that flank the friction linings 6 on a clutch disc or clutch plate 7 (only a portion of the clutch disc is shown in FIG. 1). When the clutch 1 is at least partly engaged, the plates 3, 5 are in frictional engagement with the adjacent linings 6 so that the clutch disc 7 is compelled to rotate with the plates 3 and 5, either at the same speed or at a different speed, depending upon the extent of frictional engagement between the plates 3, 5 on the one hand and the respective friction linings on the other hand.

The clutch disc 7 includes at least one carrier portion 8 the radially outer part of which is connected with segments of a back support 9 constituting a spring that is disposed between the two friction linings 6. Back support 9 includes axial elastic portions arranged to yieldably urge the linings apart, that is, toward the friction surfaces of the corresponding plates 3 and 5. Thus, when the pressure plate 3 and the counterpressure plate 5 permit it, the two friction linings 6 are spaced from each other in the axial direction of the friction clutch 1, and to the extent caused by the segments of the resilient back support 9.

When the clutch 1 is at least partly engaged, the segments of the back support 9 between the friction linings 6 are caused to store energy or additional energy in order to maintain the friction linings 6 in selected frictional engagement with the respective plates 3 and 5. The extent of possible axial movements of the two friction linings 6 toward and away from each other under the bias or against the opposition of the segments of the back support 9 can be within the range of between 0.3 mm and 1 mm, preferably between 0.5 mm and 0.8 mm. However, it is within the purview of the present invention to increase the extent of movability of the friction linings 6 relative to each other beyond the range of between 0.3 mm and 1 mm; it goes without saying that that would necessitate longer actuating distances to engage or disengage the friction clutch 1.

A diaphragm spring 10 is arranged to operate between the housing 2 and the pressure plate 3. In the embodiment of FIG. 1, the diaphragm spring 10 is actually installed in the space between the parts 2 and 3. The diaphragm spring includes an annular main portion or section 11 that serves as an energy storing means, and actuating prongs or tongues 12 that project radially inwardly from the radially inner part of the annular main portion 11. The radially innermost portions or tips 13 of the tongues 12 are configured in such a way that they can cooperate with a suitable clutch disengaging means 14. The latter can include at least one release bearing that is movable axially of the clutch 1 by an electric motor or the like (not shown), or by a hydraulic or pneumatic (fluid-operated) system, or by a combination of such clutch actuating means.

A ring-shaped, radially outer portion 15 of the diaphragm spring 10 is located radially outwardly of the main portion 11 and is tiltable relative to the housing 2. The conicity of the diaphragm spring 10 changes when its prongs 13 are depressed by the clutch actuating means 14, because that action causes the diaphragm spring to pivot at outer portion 15 relative to the housing 2. A fulcrum for the portion 15 of the diaphragm spring 10 is defined by a first fulcrum 16 that is provided on a spring-like resilient sensor 17 and by a second fulcrum 18 that is provided on a ring-shaped component 18a carried by housing 2.In the embodiment of FIG. 1, the first fulcrum 16 is part of the resilient sensor 17 that is a diaphragm spring. The latter includes a ring-shaped resilient main portion 19 that is provided with radially outwardly extending arms 20 abutting the adjacent portions of the housing 2 (as seen in the axial direction of the friction clutch 1) in such away that the sensor 17 is maintained in a stressed condition. The second fulcrum 18 is constituted by the component 18a. Because of axial stressing of the diaphragm spring or sensor 17, the ring-shaped portion 15 of the diaphragm spring 10 is clamped axially between the two ring-shaped fulcra 16 and 18.

The sensor 17 and the fulcrum 18 form part of a wear compensating device 21 that serves to ensure that, in spite of eventual wear at least upon the friction linings 6, the stressing of the diaphragm spring 10 remains at least substantially constant, at least when the friction clutch 1 is disengaged. That is ensured in that the wear compensating device 21 causes an axial displacement of the diaphragm spring 10 to an extent corresponding with the wear of at least the friction linings 6. Such axial displacement of the diaphragm spring 10 takes place axially of the friction clutch 1, in a direction toward the friction linings 6 and the counterpressure plate 5. That results in elastic deformation of the sensor 17 to an extent corresponding to the axial displacement of the diaphragm spring 10. The latter tends to move away from the bottom wall (the right-hand wall as viewed in FIG. 1) of the housing 2. To that end, the ring-shaped component 18a is provided with a ring-shaped (circumferentially extending) array of ramps 22 that slope axially of the clutch 1 and abut complementary ramps 23. The ramps 22 form integral parts of the resilient main portion 19 of the sensor 17, and the ramps 23 are integral parts of the housing 2. Additional details of the construction and mode of operation of the wear compensating device 21 are disclosed and illustrated in the aforementioned prior publications, the entire disclosure of each of which is hereby incorporated by reference.

In order to ensure an axial displacement of the resilient main portion 19 of the sensor 17 relative to the housing 2 in response to wear, at least the wear of the friction linings 6 on the clutch disc 7, there is further provided at least one energy storing device 24, such as at least one coil spring, that is installed in stressed condition between the housing 2 and the main portion 19. The coil spring 24 causes the resilient main portion 19 to turn about the axis of the friction clutch 1 as soon as the axial stress on the portion 19 decreases as a result of wear, at least the wear of the friction linings 6. A turning of the portion 19 under the bias of the coil spring 24 results in a sliding movement of the ramps 22, 23 relative to each other, to thereby move the pressure plate 3 axially away from the cover or lid of the housing 2 and toward the counterpressure plate 5. Consequently, the second fulcrum 18 remains in uninterrupted contact with the diaphragm spring 10.

As can be seen in FIG. 2, the diaphragm spring 10 is installed in the housing 2 of the friction clutch 1 in such a way that it stores energy also when the clutch is open (disengaged). In that embodiment of the present invention, such stressing of the diaphragm spring 10 is achieved in that the ring-shaped main portion 11 of that spring is flat (planar) in contrast to the frustoconical shapes of such springs in conventional friction clutches when the conventional clutches are not engaged.

The just-discussed planar or flat shape of main portion 11 of the diaphragm spring 10 in unstressed condition of the friction clutch of FIGS. 1 and 2 is achieved in that the diaphragm spring is held on the pressure plate 3 in an elastically deformed condition. To that end, the diaphragm spring 10 engages on the one hand a ring-shaped abutment 25 that is provided on the pressure plate 3 and, on the other hand, bears axially against a biasing device or biasing means 26. The illustrated ring-shaped abutment 25 is composed of an annular array of discrete projections or lobes 27 of the pressure plate 3. On the other hand, the biasing device 26 includes rivets that are affixed to the pressure plate 3 and have shanks 28 extending axially through holes or openings that are provided between (i.e., adjacent) the tongues 12 of the diaphragm spring 10. The rivets of the biasing device 26 include round heads 29 located at that side of the diaphragm spring 10 that faces away from the pressure plate 3, and that serve as axial propping means for portions of the tongues 12. FIG. 1 shows that the annular array of lobes 27 that form the abutment 25 is smaller than the fulcrum 15. Furthermore, the diameter at the biasing device 26 is smaller than that at the ring-shaped abutment 25 on the pressure plate 3 for the diaphragm spring 10.

The housing 2 carries locating means 30 that includes at least two, but preferably three, circumferentially-spaced axially-parallel rivets or other suitable protuberances that conform to the shapes of adjacent portions of the diaphragm spring 10, so that the latter is centered and is held against angular movement relative to the housing 2, pressure plate 3, and counterpressure plate 5. The rivet-shaped protuberances 30 are anchored in the cover or housing 2 radially inwardly of the main portion 11 of the diaphragm spring 10.

In order to engage the friction clutch 1 of FIGS. 1 and 2, the actuating device 14 is moved with a requisite force to further increase the bias upon the already prestressed diaphragm spring 10, namely to move the tips 13 of the tongues 12 in a direction to the left, as viewed in FIG. 1. The external force that is being applied to the tips 13 by the actuating device 14 must overcome the resistance of the prestressed spring 10, i.e., its tendency to remain in or to return to the position of FIG. 1.

During a normal actuation of the clutch 1, namely of a clutch containing intact friction linings 6 that are at least substantially devoid of wear (that normally denotes that other parts—such as the pressure plate 3 and the counterpressure plate 5—are also new, in the sense that their wear is nil or negligible), the application of pressure to the tips 13 of the tongues 12 by way of the actuating device 14 entails a shifting of the tips 13 axially of the clutch 1 toward the friction linings 6, the pressure plate 3 and the counterpressure plate 5. The diaphragm spring 10 is tilted at the ring-shaped portion 15 and its conicity changes. The result is that the diaphragm spring 10 shifts the pressure plate 3 axially at the ring-shaped abutment 25, toward the counterpressure plate 5, and to an extent that is dependent upon the selected leverage or mechanical advantage. Once a certain existing clearance or play is eliminated, the friction linings 6 of the clutch disc 7 are clamped between the friction surfaces of the plates 3 and 5. In addition, the resilient back support 9 between the two friction linings 6 undergoes gradual compression, with the result that the torque that is being transmitted by the clutch 1 increases gradually up to the maximum value that the clutch can transmit. At such time, the resilient back support 9 cannot yield any more, i.e., it has undergone maximum elastic compression and acts not unlike a solid block. In other words, the friction linings 6 and the resilient back support 9 on the clutch disc 7 jointly constitute a rigid body that maintains the plates 3, 5 at a predetermined minimal axial distance from each other and is in maximum frictional engagement therewith.

However, it is equally within the purview of the present invention to design the friction clutch in such a way that the back support 9 can furnish a spring force that is greater than the maximum closing force acting upon the diaphragm spring 10, which acts upon the pressure plate 3 so that the back support 9 can exhibit a residual resiliency that is effective between the two friction linings 6.

It will be seen that in the improved friction clutch the diaphragm spring 10 therein remains in a resiliently stressed condition, even when the clutch is not installed, and that such condition of the diaphragm spring 10 is maintained also when the friction clutch is fully assembled and installed, i.e., ready for use.

In the embodiment of FIGS. 1 and 2, those portions of the tongues 12 that extend between the main portion 11 of the diaphragm spring 10 and the biasing means 26 are maintained in elastically prestressed condition. Such stressing is attributable to the torque that is generated by the prestressed main or primary portion 11 of the spring 10. Thus, the spring characteristics of the primary portion 11 are in series with those of the prestressed portions of the tongues 12. The diaphragm spring 10 is preferably installed in such a way that a deformation thereof for the purpose of engaging the clutch 1 results in a degressive (decreasing) progress of force that is required to engage the clutch 1. To that end, it is advisable to employ a diaphragm spring 10 with a sinusoidal characteristic curve that initially rises to a force maximum, that thereupon decreases to a force minimum, and that thereafter rises above the minimum value. The operating range, i.e., the range within which the diaphragm spring 10 undergoes deformation, is preferably between the maximum and minimum forces. Such a mode of installation ensures that when the clutch 1 is being engaged, the force that is required to tilt the diaphragm spring 10 decreases as a result of the application of a corresponding force at the tips of the tongues 12. That also ensures that the force that the main portion 11 of the diaphragm spring 10 exerts is smaller and that, in turn, entails that those aforementioned portions of the tongues 12 that are disposed between the ring-shaped abutment 25 and the biasing means 26 can dissipate energy, namely until the reestablishment of an equilibrium in the stressed condition between the main portion 11 of the diaphragm spring 10 and the tongues 12 that are being stressed for the purpose of engaging the clutch.

In the embodiment of FIGS. 1 and 2, the tongues 12 that must be displaced by the actuating device 14 in order to stress the diaphragm spring 10 simultaneously act as tongues or prongs that, in effect, actuate the clutch 1. Depending upon the requirements and the nature of application, the clutch 1 of FIGS. 1 and 2 can be designed in such a way that only certain tongues 12 cooperate with the biasing means 26 that effect a stressing of the coil spring 10; alternatively, all or nearly all tongues 12 can cooperate with the suitably-configured biasing means 26 for the purpose of stressing the spring 10.

When the tongues 12 are utilized to stress the main portion 11 of the diaphragm spring, it is advisable to orient the tongues in the axial direction in such a way that, when the clutch 1 is disengaged, the tips 13 of all such tongues are located in or at least close to a common plane that is normal to the rotational axis of the clutch. However, it is also possible (for example, for certain purposes) to design the clutch in such a way that the tips 13 of at least some of the tongues or prongs 12 are axially offset relative to the tips of the other prongs; that entails a certain progressivity, i.e., a gradual buildup of the actuating force along a certain path.

Figure 3:
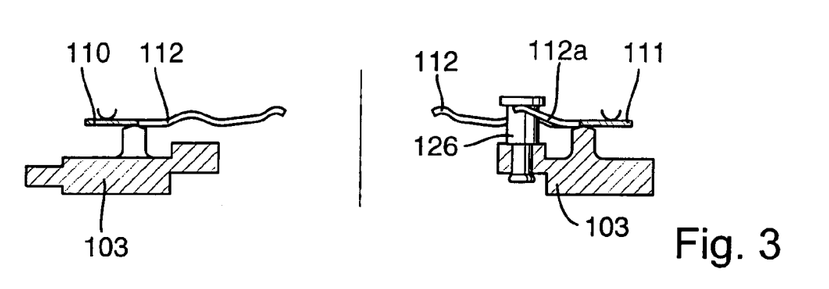
FIG. 3 is a fragmentary, axial cross-sectional view of elements of a second embodiment of a self-adjusting friction clutch in accordance with the present invention.

FIG. 3 shows a portion of a modified friction clutch wherein the diaphragm spring 110 is maintained in a stressed condition relative to the pressure plate 103 by resorting to specially designed clamping or tensioning tongues 112a that engage biasing means or abutments 126. The clamping tongues 112a are disposed between the clutch actuating tongues 112, as seen in a circumferential direction of the diaphragm spring 110. Furthermore, the clamping tongues 112a, as well as the clutch actuating tongues 112, are of one piece with the ring-shaped main portion 111 of the diaphragm spring 110.

Figure 4:
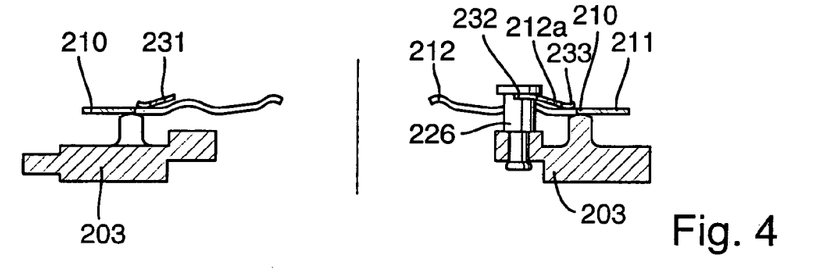
FIG. 4 is a fragmentary, axial cross-sectional view of elements of a third embodiment of a self-adjusting friction clutch in accordance with the present invention.

In the friction clutch that employs the structure of FIG. 4, the diaphragm spring 210 is maintained in stressed condition relative to the pressure plate 203 by way of a dished part 212a which, in that embodiment, also constitutes a diaphragm spring or Belleville spring having a resilient annular basic portion 231, as well as first and second supporting tongues or prongs 232, 233 that respectively extend radially inwardly and radially outwardly of the basic portion 231. The prongs 233 of the prestressed dished part 212a directly abut the diaphragm spring 210; on the other hand, the prongs 232 directly abut the biasing means 226. The diaphragm spring 210 includes an energy storing annular main portion 211 and prongs 212 that extend radially inwardly of such main portion.

The biasing means 126, 226 of FIGS. 3 and 4 are similar or analogous to the biasing means 26 in the friction clutch 1 of FIGS. 1 and 2.

Figure 5:
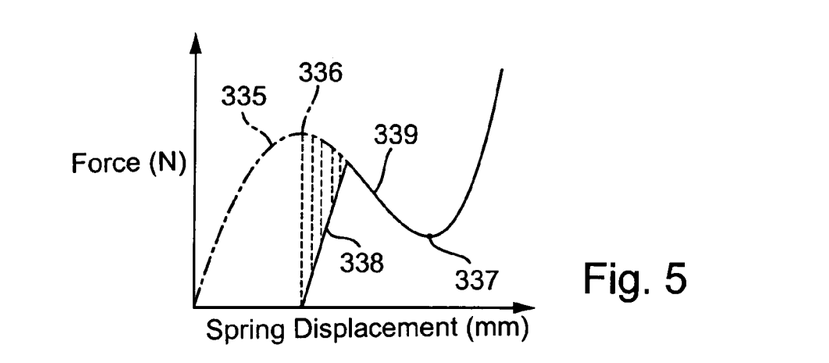
FIG. 5 is a graph showing the characteristics of a diaphragm spring in the self-adjusting friction clutch in accordance with the present invention.

The sinusoidal diaphragm spring curve 335 in the coordinate system of FIG. 5 includes a curved, dotted-line portion or section and a curved, solid-line portion or section. The displacement (in mm) of the diaphragm spring is measured along the abscissa, and the magnitude of the force (in N) is measured along the ordinate. The curve 335 includes a force peak or apex 336 (maximum force) and a lowermost force point or nadir 337. That characteristic curve is indicative of deformation of a diaphragm spring, such as the spring 10 in the friction clutch 1 of FIGS. 1 and 2, from its unstressed (relaxed) condition and while the spring is being tilted relative to a circular fulcrum, such as the ring-shaped abutment 25 shown in FIGS. 1 and 2. The curve 335 of FIG. 5 is drawn with reference to a leverage ratio that corresponds to the radial distance between the ring-shaped abutment 25 and the annular fulcrum 15.

Figure 6:
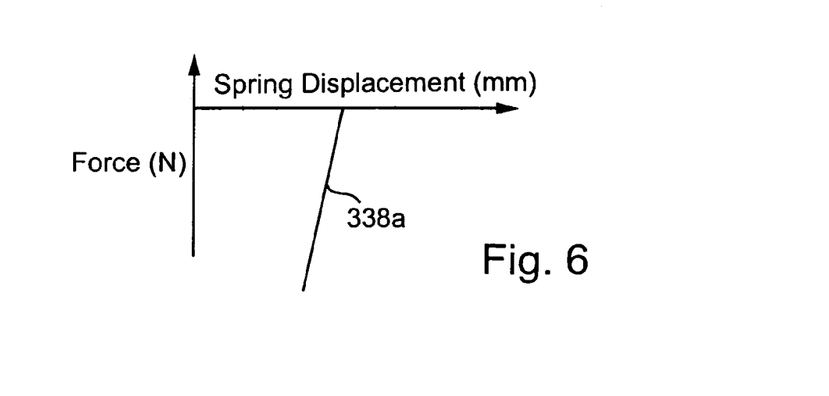
FIG. 6 is a graph showing the extent of movement of the diaphragm spring as a function of the applied force.

The coordinate system of FIG. 5 further shows the progress of the force that is being applied to the pressure plate (such as the plate 3 in the friction clutch 1 of FIGS. 1 and 2) by the prestressed diaphragm spring (for example, the spring 10 shown in FIGS. 1 and 2). Such progress of force develops during engagement of the clutch. In FIG. 5, the progress of force has an at least approximately linear portion or stage 338 and an arcuate portion or stage 339 that follows the line at stage 338. The latter (at least substantially linear) stage develops as a result of superimposition of the spring characteristic of the main portion 11 (as it prevails at 338) and the spring characteristics of those portions of the tongues 12 that are being stressed by the biasing means 26. As already described hereinbefore, the tongues 12 are elastically stressed because of the application of torque to the main portion 11 of the diaphragm spring 10. The spring characteristics 338a of the tongues 12 are shown in the diagram of FIG. 6. The result of prestressing of the tongues 12 is the establishment of a support for the torque existing in the main portion 11 of the diaphragm spring 10.

It will be seen that, for all practical purposes, in the embodiments of FIGS. 1, 2, 3, and 4 the diaphragm spring (such as 10) that furnishes the pressing force is urged against the pressure plate (such as 3) by resorting to at least one additional element. The additional biasing element can be of one piece with the diaphragm spring (see FIGS. 1, 2, and 3) or it can constitute a discrete component part (shown in FIG. 4).

Figure 7:
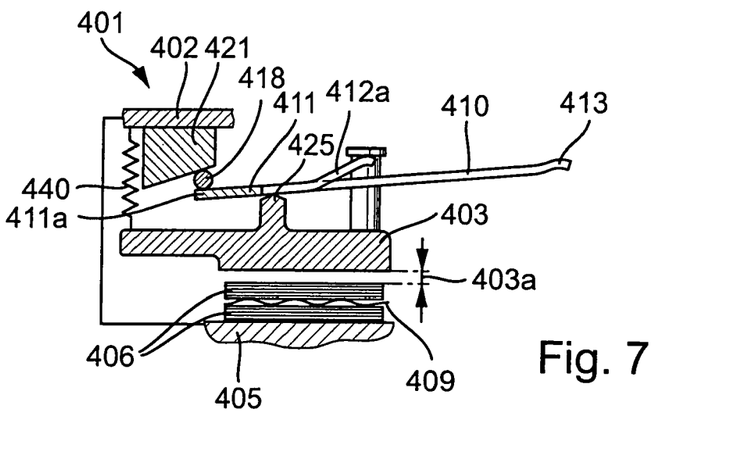
FIG. 7 is a fragmentary, axial cross-sectional view of a further self-adjusting friction clutch in accordance with the present invention.

Referring to FIG. 7, there is shown a portion of a further friction clutch 401 having a rotary housing 402 that is fixedly secured to and is driven by a rotary counterpressure plate 405, for example a flywheel that can be rotated by the crankshaft or camshaft of the prime mover in the power train of a motor vehicle. The housing 402 can rotate a pressure plate 403 that is axially movable therein so that it can compress or release the friction linings 406 at the periphery of a clutch disc (not shown). The friction linings 406 flank a resilient back support 409 that is a functional equivalent of the biasing means 9 in the clutch of FIGS. 1 and 2.

The pressure plate 403 carries a prestressed diaphragm spring 410 having a ring-shaped main portion 411 that includes radially outer parts or sections 411a abutting a ring-shaped member 418 that serves as a fulcrum and is axially separated from the cover or lid of the housing 402 by a wear compensating unit 421. The unit 421 serves to automatically compensate for wear of at least some (such as the friction linings 406) of the parts that undergo wear in actual use of the friction clutch 401, and includes at least one set of ramps that cause the pressure plate 403 to move incrementally toward the counterpressure plate 405 (i.e., away form the lid of the housing 402) as the wear of the friction linings 406 (and certain other parts of the clutch 401) progresses. In the embodiment of FIG. 7, the diaphragm spring 410 is again provided with integral additional resilient elements in the form of tongues 412a that serve the same purpose as the tensioning or clamping tongues 112a of the median portion 111 of the diaphragm spring 110 in the friction clutch shown in FIG. 3.

FIG. 7 further shows, only schematically, a resilient element 440, here illustrated in the form of a coil spring, that serves to resiliently couple the pressure plate 403 and the diaphragm spring 410 with the housing 402 in such a way that it yieldably opposes axial movements of the parts 402, 403 relative to each other. That coil spring can be replaced by or utilized jointly with two or more coil springs, or with one, two, or more other suitable resilient elements that can serve the same purpose, i.e., to yieldably urge the pressure plate 403 and/or the diaphragm spring 410 axially toward the housing 402. As already mentioned hereinbefore, individual spring elements can be replaced with resilient sensors of the type shown at 17 in the friction clutch 1 of FIGS. 1 and 2, either alone or in conjunction with prestressed leaf springs, such as those shown at 4 in FIG. 1, to serve as a means for axially yieldably, but non-rotatably or substantially non-rotatably coupling the pressure plate 3 to the housing 2, for example by a circular array of rivets or the like.

The axial force that is generated by the resilient element(s) 440 ensures that, at least until the pressure plate 403 reaches and bears upon the nearer (upper) friction lining 606 of FIG. 7, the diaphragm spring 410 is urged against the fulcrum 418 in such a way that it is conically deformable at that fulcrum without any axial movement of the fulcrum away from the housing 402, i.e., toward the counterpressure plate 405. Otherwise stated, no adjustment by way of the wear compensating unit 421 can take place prior to actual wear of the friction linings 406, and of other parts that are likely to undergo wear in actual use of the friction clutch 401, at least not before the pressure plate 403 reaches and contacts the nearer friction lining 406.

Reference numeral 425 denotes a ring-shaped abutment that is provided on the pressure plate 403, and corresponds to the abutment 25 shown in FIG. 2.

Figure 8:
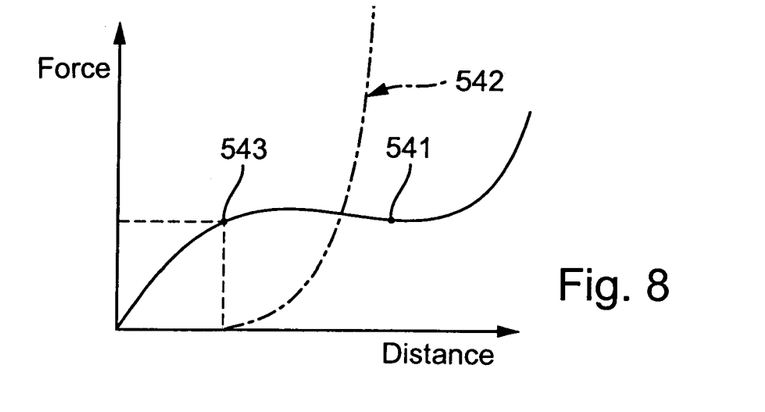
FIG. 8 is a graph showing various characteristics of certain constituents of an improved self-adjusting friction clutch in accordance with the present invention.

In the coordinate system of FIG. 8, the distance is measured along the abscissa and the force is measured along the ordinate. The characteristic curves shown in that diagram can develop in a friction clutch that embodies the present invention. The curve 541 is indicative of the clutch engaging force, and the curve 542 represents variations of the force that develops when certain parts are caused to bear upon each other. The curve 542 denotes the progress of force that, by referring for example to FIG. 7, is being applied to the tips 413 of the prongs of the prestressed diaphragm spring 410 in order to engage (close) the friction clutch 401. Such force develops as a result of cooperation between the biasing means 409 intermediate the friction linings 406 (such biasing means is stressed axially by the resilient element(s) 440), and the force of the aforementioned additional resilient elements, such as, for example, the tongues 412a of the prestressed diaphragm spring 410. The curve 542 begins as soon as the biasing means 409 between the friction linings 406 begins to undergo compression.

The compressing force that is being applied to the pressure plate 403 by the resilient element(s) 440 (as already mentioned hereinabove, reference numeral 440 denotes or can denote but one of the plurality of discrete springs) is selected in such a way that it at least approximates or corresponds to the clutch engaging force acting upon the tips 413 of prongs forming part of the diaphragm spring 410. Such clutch-engaging force develops when the pressure plate 403 comes in contact with the adjacent friction lining 406. Thus, the axial force being applied to the resilient element(s) 440 should correspond to the clutch engaging force that is being applied to the tips 413 at the start of the characteristic curve 542. Such force is denoted in FIG. 8 by the point 543 on the curve 541. The biasing means 409 between the friction linings 406 of FIG. 8 actually undergoes compression when the magnitude of the force denoted by the force-distance characteristic curve 541 increases beyond that denoted by the point 543, as viewed in the direction of engagement of the friction clutch 401.

Figure 9:
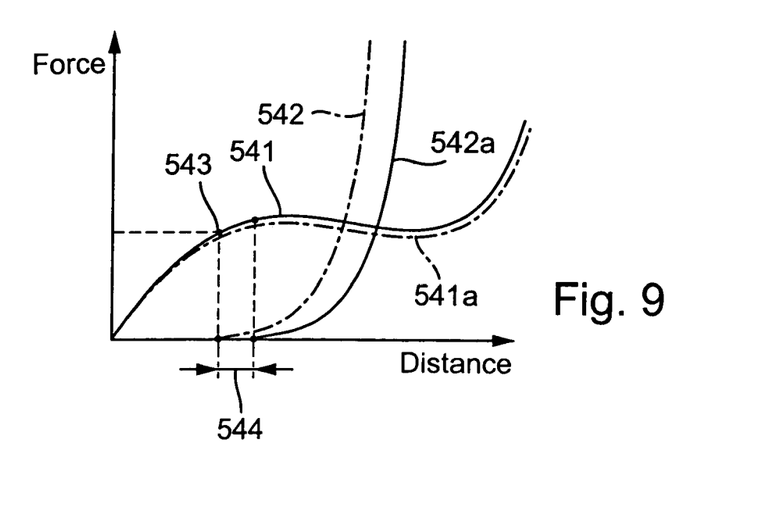
FIG. 9 is another graph that shows the mode of operation of an embodiment of a self-adjusting friction clutch in accordance with the present invention.

FIG. 9 again shows the characteristic force-distance curves 541, 542 of FIG. 8 as well as the supporting force 543 that acts on the pressure plate, such as the pressure plate 403 in the friction clutch 401 of FIG. 7. FIG. 9 further shows the directions or trends of changes or shifts of such characteristic curves in response to the development of wear of the friction linings 406. In the embodiment to which the curves of FIG. 9 apply or pertain, the extent of wear is represented by the distance 544, which is exaggerated in FIG. 9 for illustrative purposes. In actual practice, the extent of wear that causes an adjustment or compensation, such as by the wear compensating unit 421 schematically shown in FIG. 7, is much smaller. In fact, and under ideal circumstances, the compensation for wear can take place continuously or by steps of more or less negligible magnitude.

Referring again to the friction clutch 401 of FIG. 7, when at least the friction linings 406 have undergone a certain amount of wear, the pressure plate 403 comes into actual contact with the nearer (upper) friction lining 406 only after it has covered a relatively large distance 403a on its way in a direction downwardly, as viewed in FIG. 7. An increase of such extent of movement of the pressure plate 403 in a direction to engage the friction clutch 401 entails an increase of the distance 544 shown in the coordinate system. Since the biasing means 409 between the two friction linings 406 can be stressed only when the distance 403a is reduced to zero, and the pressure plate 403 continues to advance toward the counterpressure plate 405, the characteristic curve 542 denoting the engagement of the clutch 401 is shifted from the broken-line position to the solid-line position 542a of FIG. 9. That Figure further shows that the characteristic force-distance curve 541 also undergoes a change (namely from 541 to 541a) when the magnitude of force denoted by the curve 541 increases beyond that represented by the point 543.

FIG. 9 also shows that, when the point 543 is exceeded, the applied engaging force is greater than that at 543 that acts upon the corresponding pressure plate (403 in the friction clutch 401 of FIG. 7) to urge the pressure plate against the wear compensating unit 421 by way of the diaphragm spring 410. The result is that, from that instant on, the diaphragm spring 410—practically without a change of its conicity—and the pressure plate 403 jointly move axially of the friction clutch 401 until the pressure plate returns into contact with the adjacent friction lining 406. Such joint displacement of the diaphragm spring 410 and the pressure plate 403 corresponds, at least substantially, to the distance 544 shown in the coordinate system of FIG. 9. During such movement of the pressure plate 403, the stress on the wear compensating device 421 is reduced so that the ring-shaped fulcrum 418 can move axially to an extent that is at least substantially commensurate with the wear, at least of the friction linings 406. That ensures that, during the next-following disengagement of the clutch 401, the diaphragm spring 410 returns to a position at least close to that when the friction clutch was new, i.e., when the wear of the friction linings 406 was nil or negligible. In other words, the conicity of the diaphragm spring 410 and its stressing are again the same as when the friction clutch 401 was new.

The schematically represented resilient element 440 of FIG. 7 exerts on the diaphragm spring 410 and on the pressure plate 403 a force that can be furnished, for example, by leaf springs of the type disclosed in German Patent No. 198 55 583 A. Alternatively, it is also possible to furnish such force by resorting to a diaphragm spring that is of one piece with resilient tongues and is of the type disclosed, for example, in German Patent No. 195 24 827 A.

Figure 10:
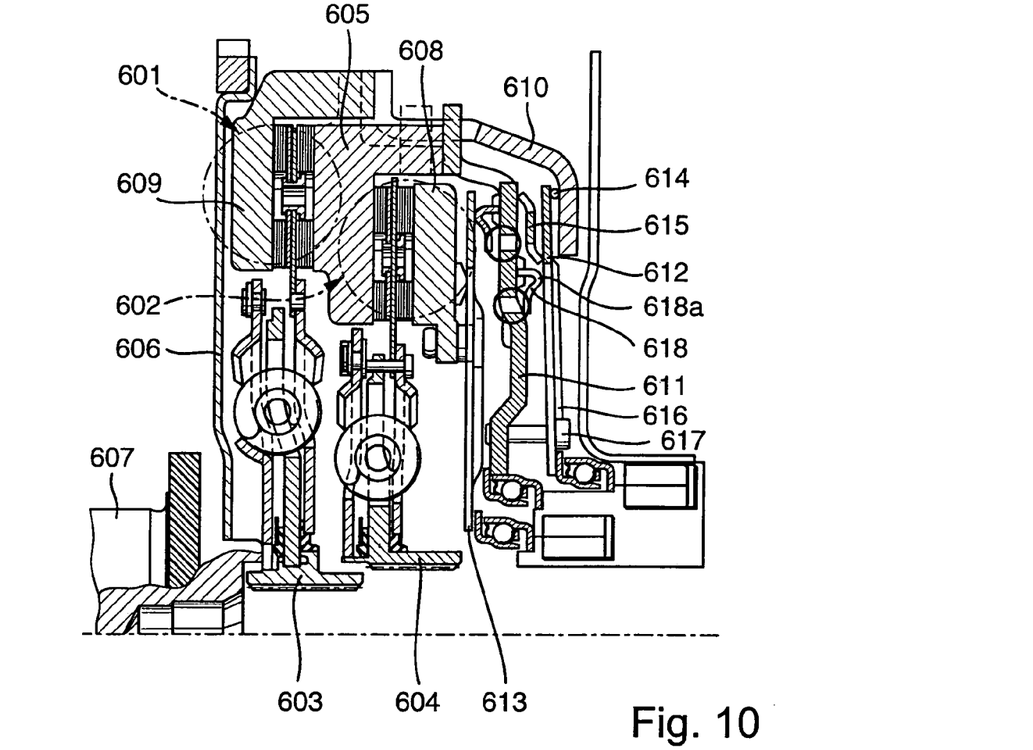
FIG. 10 is a fragmentary, axial cross-sectional view of a twin friction clutch.

FIG. 10 shows a portion of a twin clutch including a first clutch 601 and a second clutch 602. The latter can be of the type corresponding to one of those already described with reference to FIGS. 1 to 9.

The twin clutch includes two clutch discs 603, 604, each of which can be connected with a different one of two transmission input shafts, and each of which includes a torsional vibration damper. The friction linings of each of the clutch discs 603, 604 flank discrete resilient back supports, of the type shown at 9 in FIG. 1 or at 409 in FIG. 7, for example.

The clutch discs 603, 604 flank a common counterpressure plate 605 that is or can form part of a flywheel and includes axially-extending portions or sections (not shown) that connect it with a plate-like driving element 606. The radially inner portion of the latter is connected with and can receive torque from a rotary output element 607 (such as a crankshaft) of a prime mover (for example, an internal combustion engine) in the power train of a motor vehicle.

The clutch 602 has a pressure plate 608 that is (directly or indirectly) non-rotatably connected to the counterpressure plate 605 (for example, by way of leaf springs and/or analogous parts) with limited freedom of axial movement. The friction clutch 601 also includes a pressure plate 609 that is non-rotatably connected to the counterpressure plate 605 with limited freedom of axial movement. The pressure plate 609 is connected with a housing 610 that, in the structure of FIG. 10, consists of a sheet-metal cover. The pressure plate 609 and the cover 610 are movable axially as a unit.

The common counterpressure plate 65 is fixedly connected with a housing-like part 611 that can be formed from sheet metal. The part 611 is flanked by the diaphragm springs 612 of the friction clutch 601 and 613 of the friction clutch 602. As already mentioned hereinbefore, the mode of operation of the friction clutch 602 is or can be similar or analogous to that of one of the friction clutches already described with reference to FIGS. 1 to 9.

The radially outer portion of the diaphragm spring 612 is supported by the cover or housing 610 by way of a fulcrum 614. A radially inner portion of the diaphragm spring 612 is supported by a resilient element 615, shown as a diaphragm spring that abuts the radially outer portions of the housing or cover 611. The diaphragm spring 612 is analogous to certain previously-described diaphragm springs; it includes an annular main portion or basic portion that serves as an energy storing means and carries radially-outwardly-extending actuating tongues 616. That diaphragm spring is maintained in stressed condition relative to the housing 611; to that end, there are provided supporting elements 617 that are connected with the housing 611 and include portions bearing upon and stressing the diaphragm spring 612.

A wear-compensating unit 618, at least for the friction linings on the disc 604, is installed between the diaphragm spring 612 and the housing 611. The exact construction and mode of operation of the unit 618 form no part of the present invention; that unit can be constructed and assembled and can operate in a manner as disclosed in the preceding passages of that specification and/or in one or more prior publications that are identified herein and the entirety of each of which is hereby incorporated herein by reference.

Figure 11:
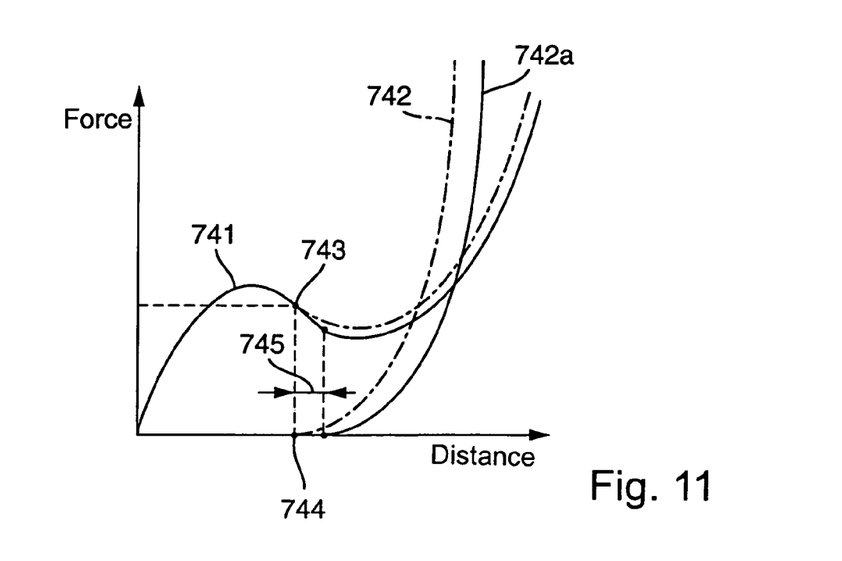
FIG. 11 is a graph showing the mode of operation of the clutch shown in FIG. 10.

The mode of operation of the wear compensating unit 618 will be described hereinbelow with reference to FIG. 11, wherein the coordinate system shows a characteristic curve 741 denoting the clutch engaging force. During engagement of the clutch of FIG. 10, the pressure plate 609 is subjected to the action of a force that is represented by the characteristic (pressure denoting) curve 742. The origin of that curve coincides with the application of pressure to the friction linings on the clutch disc 603, namely against the opposition of the non-referenced resilient back support between such friction linings. When the just-discussed friction linings on the clutch disc 603 are still new (i.e., when the wear of such friction linings is still at least close to zero), the diaphragm spring 612 of FIG. 10 is subjected to the action of an axial supporting force that is denoted by the point 743 on the curve 741 of FIG. 11. Such axial supporting force is furnished exclusively, or at least predominantly, by the diaphragm spring 615 of FIG. 10. If the pressure plate 609 is further subjected to the bias of one or more additional prestressed resilient elements, the axial force(s) furnished by such additional resilient element(s) also requires or require consideration.

The magnitude of the resilient supporting force that acts on the diaphragm spring 612 is selected in such a way that it at least approximates the clutch engaging force that prevails at the start (at 744) of the characteristic curve 742 of the pressure plate 609 shown in FIG. 10.

When the friction linings have undergone a certain amount of wear (shown greatly exaggerated in FIG. 11 as 745), the pressure plate 609 is shifted, together with the housing 610, in a direction to the right as viewed in FIG. 10. That results in a change of the stressing and conicity of the diaphragm spring 612.

During a disengagement and subsequent engagement of the clutch 601 after wear has developed on the friction linings of the clutch disc 603, the pressure plate 609 must cover a somewhat greater distance in order to come into contact with one of the friction linings on the clutch disc 603. That distance corresponds to that shown in FIG. 11 at 745. Because of the greater distance, the shape of the characteristic curve 742 of the pressure plate 603 is also changed, namely from 742 to 742a. Because of the downward slope of the characteristic curve 741 of the clutch engaging force within the range 745 in FIG. 11, the axial supporting force acting on the diaphragm spring 612 within the range 745 (such force is furnished primarily by the diaphragm-spring-shaped component 615) is greater than the actuating force, so that the pressure plate 609 and the housing or cover 610 (that is rigid with the plate 609) are shifted in a direction to the right, as viewed in FIG. 10; such shifting movement is shared by the diaphragm spring 612. That relaxes the stress on the adjusting ring 618a of the wear compensating device 618 shown in FIG. 10, so that the part 618a can compensate for axial play that tends to develop between the diaphragm spring 612 and the housing 611. When the adjustment (to compensate for wear) is completed, the diaphragm spring 612 reassumes that stressed condition that corresponds to the position prior to development of wear of the parts of the friction clutch.

Figure 12:
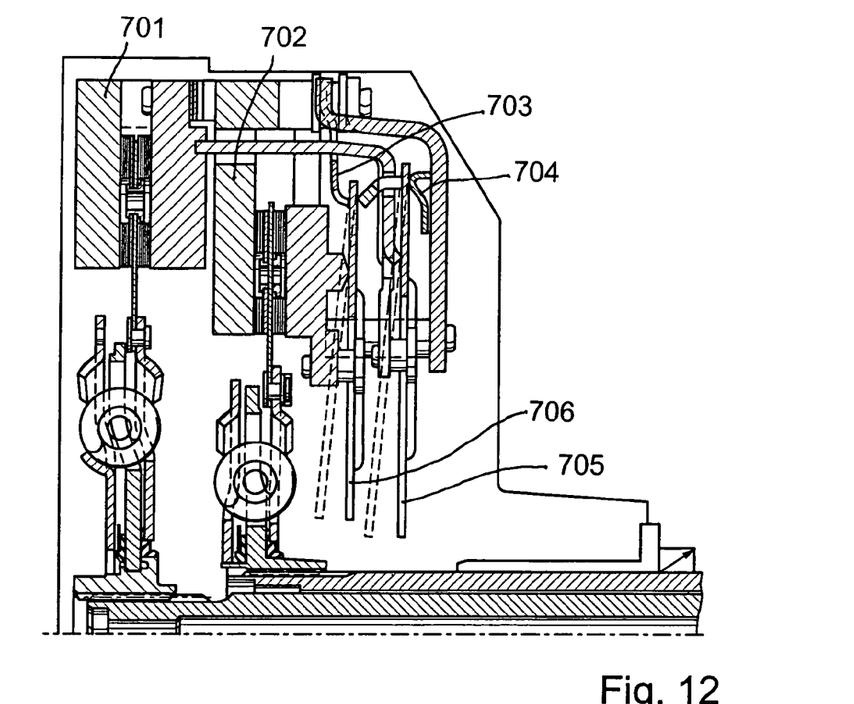
FIG. 12 is a fragmentary, axial cross-sectional view similar to that of FIG. 10 but showing certain details of a modified twin friction clutch.
Figure 13:
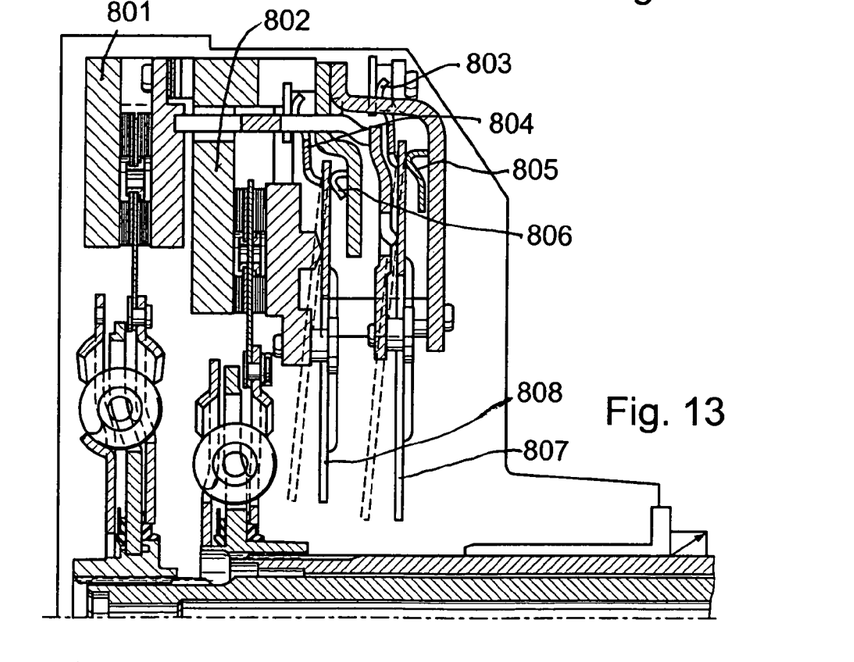
FIG. 13 is a fragmentary, axial cross-sectional view similar to that of FIG. 12 but showing certain details of a further modified twin friction clutch.

FIGS. 12 and 13 illustrate additional clutch assemblies, each of which can utilize at least one of the above-described novel friction clutches. FIG. 12 shows a dual clutch structure in which two axially-spaced, coaxial clutches 701, 702 are provided. A single adjustment system includes a sensor spring 703, an adjusting ring 704, a first level spring 705, and a second lever spring 706.

FIG. 13 shows a dual clutch structure similar to that of FIG. 12, except that the FIG. 13 structure includes clutches 801, 802 and two adjustment systems. Two sensor springs 803, 804, two adjusting rings 805, 806, and two lever springs 807, 808 are provided.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above-outlined contribution to the art of automatically adjustable friction clutches, and therefore such adaptations should and are intended to be comprehended within the meaning and range of equivalence of the appended claims.

What is claimed is:

1. A repeatedly engageable and disengageable friction clutch comprising:
   a housing rotatable about a predetermined axis;
   a pressure plate non-rotatably connected to said housing and axially movable relative thereto in a first direction to engage the clutch and in a second direction to disengage the clutch; and
   a diaphragm spring tiltably disposed within said housing in a continuously elastically deformed condition, wherein said diaphragm spring is mounted on said pressure plate in said elastically deformed condition before the clutch is installed in and put to use in a power train of a motor vehicle so that at clutch operational readiness, but not yet actuated, the clutch is disengaged.

2. A clutch in accordance with claim 1, wherein said pressure plate includes a ring-shaped support region for supporting said diaphragm spring, and biasing means that is radially offset relative to said support region and that maintains said diaphragm spring against said pressure plate in an elastically deformed condition.

3. A clutch in accordance with claim 2, wherein said biasing means is axially fixed relative to said pressure plate.

4. A clutch in accordance with claim 2, wherein said biasing means includes an annular array of elements that are rigidly connected with said pressure plate and extend axially through openings provided in said diaphragm spring and engage a side of the diaphragm spring that faces opposite to said pressure plate.

5. A clutch in accordance with claim 4, wherein said biasing means are formed by pins riveted to said pressure plate and include enlarged regions disposed at a side opposite to the pressure plate and enlarged at least in a circumferential direction, on which enlarged regions the biased diaphragm spring is axially supported.

6. A clutch in accordance with claim 1, wherein said diaphragm spring includes an annular main portion, and tongues extending radially inwardly from an inner edge of said main portion, wherein in a region of at least individual tongues support is provided to ensure diaphragm spring bias.

7. A clutch in accordance with claim 1, including a compensation device provided between the diaphragm spring and the clutch housing to compensate for wear of at least clutch disk friction linings.

8. A clutch in accordance with claim 7, wherein said compensation device includes at least one spring axially supported by said diaphragm spring in the engaged condition of the clutch, and an adjusting ring operative between said housing and said diaphragm spring to axially displace said diaphragm spring relative to said housing through a distance that is a function of friction lining wear.

9. A clutch in accordance with claim 1, further including at least substantially concentric first and second ring-shaped fulcrums respectively provided on said housing and said pressure plate, wherein said diaphragm spring includes a radially outer annular pivot region that is supported on a fulcrum provided on the housing, and wherein the diaphragm spring further includes an inwardly-lying annular region that cooperates with an annular abutment carried by the pressure plate.

10. A clutch in accordance with claim 9, wherein one of said fulcrums is nearer to a clutch longitudinal axis than the other of said fulcrums.

11. A clutch in accordance with claim 1, wherein said diaphragm spring is elastically deformed upon engagement of the clutch.

12. A clutch in accordance with claim 1, wherein the clutch is mounted on a counterpressure plate, wherein a clutch disc provided between the counterpressure plate and the pressure plate has at least two friction linings, and a lining spring is provided axially between the at least two friction linings.

13. A clutch in accordance with claim 12, wherein the combined pressures applied to the diaphragm spring by the axial force produced by a lining spring as well as by the axial force produced by the at least one sensor spring operate in the same axial direction.

14. A clutch in accordance with claim 13, wherein the axial force produced by the lining spring and the axial force exerted on the diaphragm spring by the at least one sensor spring and resulting from the axial force produced by the diaphragm spring tongues for engaging the clutch are in opposite directions.

15. A clutch in accordance with claim 12, wherein a lining spring characteristic curve and the installation condition of the sensor spring in reference to the engagement course of the clutch are coordinated in such a way that upon the occurrence of wear on at least the friction linings of the clutch disk an operating engagement for required for tilting the diaphragm spring is greater than the oppositely directed axial engagement force and the resulting axial force acting on the diaphragm spring which is produced at least by the lining spring and the sensor spring force.

16. A clutch in accordance with claim 15, wherein said characteristic curve is related to the condition of said at least one sensor in such a way that the force that is required to deform said diaphragm spring during engagement of the clutch exceeds an axial force furnished by said lining spring and said at least one sensor spring.

17. A clutch in accordance with claim 16, wherein the resulting axial force is additionally produced by leaf springs that are axially biased between said housing and said pressure plate and that serve at least to transmit torque between said housing and said pressure plate.

* * * * *